US011465311B2

(12) United States Patent
Grünes (10) Patent No.: US 11,465,311 B2
(45) Date of Patent: Oct. 11, 2022

(54) SEPARATING APPARATUS AND SEPARATING METHOD FOR ADHESIVE-CONTAINING COMPOSITE MATERIAL

(71) Applicant: LTS Lohmann Therapie-Systeme AG, Andernach (DE)

(72) Inventor: Bernd Grünes, Bonn (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 195 days.

(21) Appl. No.: 16/771,569

(22) PCT Filed: Dec. 11, 2018

(86) PCT No.: PCT/EP2018/084281
§ 371 (c)(1),
(2) Date: Jun. 10, 2020

(87) PCT Pub. No.: WO2019/115495
PCT Pub. Date: Jun. 20, 2019

(65) Prior Publication Data
US 2020/0391402 A1 Dec. 17, 2020

(30) Foreign Application Priority Data
Dec. 13, 2017 (DE) ..................... 10 2017 011 506.0

(51) Int. Cl.
*B26F 1/44* (2006.01)
*B32B 38/10* (2006.01)
(Continued)

(52) U.S. Cl.
CPC ................ *B26F 1/44* (2013.01); *B32B 38/10* (2013.01); *B26F 1/3846* (2013.01); *B26F 1/40* (2013.01);
(Continued)

(58) Field of Classification Search
CPC . B26D 5/08; B26D 7/2635; B26F 1/38; B26F 1/3846; B26F 1/40; B26F 1/44; B26F 2001/4481; B32B 38/04; B32B 38/10
See application file for complete search history.

(56) References Cited

U.S. PATENT DOCUMENTS 6,095,023 A * 8/2000 Harada ................ B25J 15/0616
83/152
6,684,925 B2 * 2/2004 Nagate .................. B32B 43/006
156/542

(Continued)

FOREIGN PATENT DOCUMENTS

DE         19831418 A1    1/2000
DE    102005002014 A1    7/2006
(Continued)

*Primary Examiner* — Stephen Choi
(74) *Attorney, Agent, or Firm* — The Webb Law Firm (57) ABSTRACT

The invention relates to an apparatus comprising a separating tool and comprising a counterpressure plate for producing contour geometries in adhesive-containing composite materials, wherein the separating tool can be moved in translational tool stroke directions between an inoperative position and a parting position normal to the counterpressure plate, and also to a method for producing contour geometries in adhesive-containing composite materials by means of an apparatus of this kind. The separating tool and the counterpressure plate can be actuated relative to one another by means of at least one actuator in at least one excitation direction with a ramp function and/or with a jump function. Each of these excitation directions lies in a parallel plane to a cutting edge plane of the separating tool. The present invention permits reliable separation of a stamped grid from laminate sections which remain on a carrier film.

7 Claims, 7 Drawing Sheets (51) Int. Cl.
*B26F 1/38* (2006.01)
*B26F 1/40* (2006.01)
*B32B 38/04* (2006.01)

(52) U.S. Cl.
CPC ....... *B26F 2001/4481* (2013.01); *B32B 38/04* (2013.01)

(56) References Cited

U.S. PATENT DOCUMENTS

| | | | |
|---|---|---|---|
| 10,654,187 B2 * | 5/2020 | Fischer | B26D 7/086 |
| 2008/0026090 A1 | 1/2008 | Ehrbar | |
| 2016/0159069 A1 * | 6/2016 | Huang | B32B 43/006 156/707 |

FOREIGN PATENT DOCUMENTS

| | | | |
|---|---|---|---|
| EP | 1882564 | A2 | 6/2008 |
| JP | 2002307382 | A * | 10/2002 |
| JP | 2013074104 | A | 4/2013 |
| JP | 2017104923 | A | 6/2017 |
| WO | 2009072377 | A1 | 6/2009 |

* cited by examiner

SEPARATING APPARATUS AND SEPARATING METHOD FOR ADHESIVE-CONTAINING COMPOSITE MATERIAL

CROSS-REFERENCE TO RELATED APPLICATIONS

This application is the United States national phase of International Application No. PCT/EP2018/084281 filed Dec. 11, 2018, and claims priority to German Patent Application No. 10 2017 011 506.0 filed Dec. 13, 2017, the disclosures of which are hereby incorporated by reference in their entirety.

DESCRIPTION

The invention relates to an apparatus comprising a separating tool and comprising a counterpressure plate for producing contour geometries in adhesive-containing composite materials, wherein the separating tool is adapted to be moved normal to the counterpressure plate in translational tool stroke directions between an inoperative position and a parting position, wherein, in the separating position, the separating tool is spaced apart from the counterpressure plate in the direction of the rest position and wherein the separating tool comprises a tool cutting edge having a cutting edge plane spanned normal to the tool stroke directions, as well as a method for producing contour geometries in adhesive-containing composite materials using such an apparatus.

BACKGROUND ART

From DE 198 31 418 A1 such an apparatus and such a method are known. They are adapted to be used for thin pressure-sensitive adhesive layers.

It is an object of the present invention to reliably separate a stamped grid from laminate portions remaining of a carrier film.

SUMMARY OF THE INVENTION

This object is achieved with the features of the main claim. For this purpose, the apparatus comprises at least one actuator. The separating tool and the counterpressure plate are adapted to be controlled relative to each other in at least one excitation direction by means of each actuator using a ramp function and/or a jump function. Moreover, each of these excitation directions lies in a parallel plane to the cutting edge plane of the separating tool.

The separating tool is moved in translational tool stroke directions between an inoperative position and a parting position spaced apart from the counterpressure plate and normal to the counterpressure plate, and moved back again. The separating tool parts the composite material comprising, at least area-wise, an adhesive-containing substrate layer. In the parting position and/or during the return stroke, the at least one actuator controls the separating tool and the counterpressure plate relative to each other in parallel to the cutting edge plane by means of a ramp function or a jump function.

The adhesive-containing composite material is part of a laminate sheet conveyed by means of a discontinuous conveyor, for example. It is e.g. made up of a carrier film, an adhesive-containing and possibly active-substance-containing layer adhering thereto and a cover film adhering to the adhesive-containing layer. For producing contour geometries in the adhesive-containing composite material, the separating tool configured as a ring knife, for example, is moved in a tool stroke direction from the inoperative position towards the parting position. Here, the cover layer is completely parted and the adhesive-containing layer is parted at least area-wise. The carrier film is not parted. For parting portions of the adhesive-containing layer remaining between the inner area and the outer area, the separating tool and the counterpressure plate are excited relative to each other by means of an actuator. Here, the two components can be displaced with respect to each other by means of a ramp function and/or excited to vibrate by means of a jump function, e.g. by a ram pulse. This takes place at least in the parting position, that is when the separating tool has reached its smallest distance to the counterpressure plate. The movement of the separating tool relative to the counterpressure plate can be continued during the return stroke. The excitation of the separating tool and the counterpressure plate relative to each other is performed on a parallel plane to the cutting edge plane of the separating tool. This cutting edge plane is normal to the center axis of the separating tool and to the tool stroke directions. Thus the stamped grid surrounding the laminate portions remaining on the carrier film can be easily peeled off.

Further details of the invention are described in the subclaims and the following descriptions of schematically illustrated exemplary embodiments.

DESCRIPTION OF THE INVENTION

Figure 1:
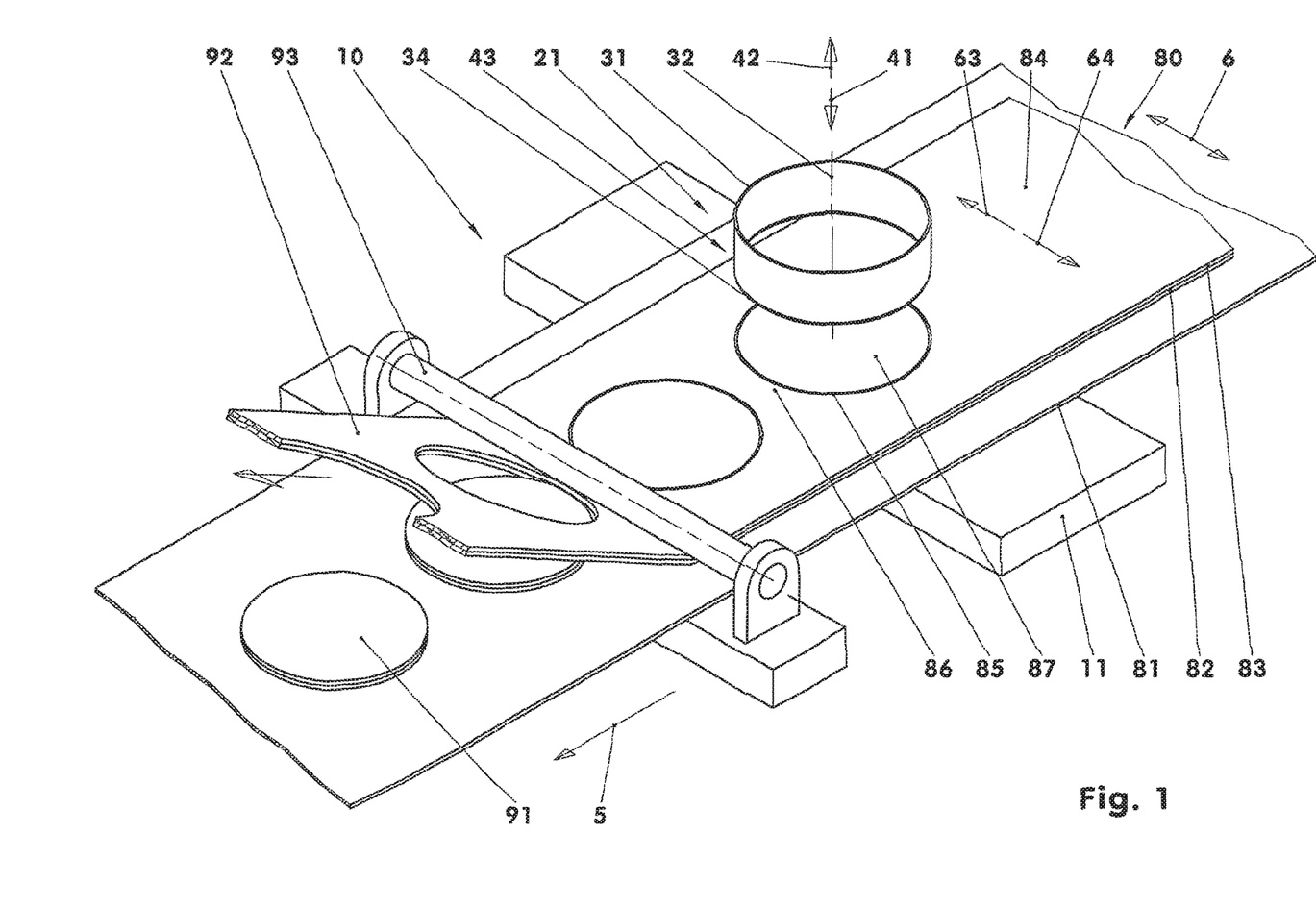
FIG. 1: Apparatus for producing laminate portions.

FIG. 1 shows an apparatus for producing laminate portions (91) from a laminate sheet (80). The laminate sheet (80) is intermittently conveyed by means of a discontinuous conveyor in a conveying direction (5). The cycle frequency of the conveyor apparatus ranges between 5000 and 6000 conveying strokes per hour. At each cycle, the laminate sheet (80) which is e.g. several hundreds of meters long and wound off a roll is gripped and pulled by a feed rate in the conveying direction (5). This feed rate is five centimeters per cycle, for example.

The laminate sheet (80) is an adhesive-containing composite material (80). In the exemplary embodiment, the composite material (80) is made up of three layers (81-83). The lowermost layer is a transport film (81) with a thickness ranging between 75 micrometers and 100 micrometers. In the width direction (6) oriented transverse to the conveying direction (5), the width is 75 millimeters, for example. In the exemplary embodiment, the transport film is made from polyethylene terephthalate (PET). It is dehesively configured, for example.

An adhesive-containing substrate layer (82) adheres to the transport film (81). This substrate layer (82) can contain additional active substances. In the width direction (6), the width of the substrate layer (82) amounts to two thirds of the width of the transport film (81), for example. The transport film (81) extends on both sides beyond the substrate layer (82) which is arranged symmetrically to its vertical central longitudinal axis. The substrate layer (82) has a thickness ranging between 100 micrometers and 500 micrometers, for example. The elongation at break of the adhesive-containing substrate layer (82) is larger than 50%, for example, it ranges e.g. between 50% and 100%. The modulus of elasticity is smaller than 30 Newton per square millimeters, for example.

The substrate layer (82) is covered by a cover film (83). The cover film (83) can be made from the same material as the transport film (81). It has a thickness of e.g. 23 micrometers. The tensile strength at break amounts to 40 Newton per centimeter, for example. The tensile strength at break, that is the length-related force at which an incipient crack occurs, ranges between 100 Newton per centimeter and 140 Newton per centimeter. The elongation at break ranges between 80% and 120%. These values correspond to the values of the transport film (81), for example. The cover film (83) can be dehesively provided at least on the side facing the substrate layer (82).

In the illustration of FIG. 1, above the laminate sheet (80) a separating tool (31) is shown as a component of a separating tool unit (21). This separating tool (31) is a ring knife (31). It has a closed tool cutting edge (34) which is oriented towards the laminate sheet (80). The entire tool cutting edge (34) which is of a circular-ring configuration, for example, is disposed in a plane parallel to the surface (84) of the laminate sheet (80) and parallel to a counterpressure plate (11) arranged below the laminate sheet (34). The tool cutting plane (34) can also be of an elliptical, oval, triangular or polygonal etc. configuration.

In FIG. 1, the separating tool (31) is illustrated in an inoperative state (43). In this inoperative state (43), the separating tool (31) is spaced apart from the laminate sheet (80).

The separating tool is adapted to be moved normal to the counterpressure plate (11) from the inoperative position (43) into a parting position (44) and back in tool stroke directions (41, 42) by means of a tool lifting/lowering apparatus. In the parting position (44) of the separating tool (31), cf. FIG. 9, the separating tool (31) is spaced apart from the counterpressure plate (11) at least by the thickness of the transport film (81). In the parting position (44), the tool stroke of the separating tool (31) translationally oriented and normal to the counterpressure plate (11) has reached it reversal point. This tool stroke of the separating tool (31) can take place during standstill or during conveyance of the conveying apparatus. In the latter case, the separating tool unit (21) is adapted to be moved e.g. together with the conveying means.

During the tool stroke of the separating apparatus (31) normal to the counterpressure plate (11), e.g. closed contour geometries (85) are produced in the laminate sheet (80). The contour geometry (85) can also be a straight line or an open bent line. The shape of the respective contour geometry (85) corresponds to the shape of the tool cutting edge (34) of the separating tool (31). During this working stroke, the cover film (83) and the substrate layer (82) are stretched and at least largely parted. The portion of the laminate sheet (80) surrounded by the contour geometry (85) in this exemplary embodiment is hereinafter referred to as inner area (87).

The separating tool (31) is adapted to be moved relative to the laminate sheet (80) in two opposite excitation directions (63, 64) and parallel to the counterpressure plate (11). These displacing directions (63, 64) identical with the excitation directions (63, 64) lie in a normal plane to the center axis (32) of the separating tool (31). The center axis (32) is the geometrical center axis (32) of the separating tool (31). This displacement of the separating tool (31) is performed at least in the parting position (44). Here, the displacing directions (63, 64) additionally lie in a normal plane to the tool stroke directions (41, 42). The displacing movement can be continued during the return stroke (42). In the illustration of FIG. 1, the displacing directions (63, 64) are linearly aligned. They are oriented normal to the conveying direction (5). However, it is also conceivable that the displacing directions (63, 64) are oriented in parallel to the conveying direction (5). Also, the displacing directions (63, 64) can lie on a circular path about the geometrical center axis (32) of the separating tool (31).

During the following method step, the stamped grid (92) surrounding the inner areas (87) is peeled off. The stamped grid (92) comprises areas of the cover film (83) as well as areas of the substrate layer (82). In the illustration of FIG. 1, this is effected at a deflection roller (93). On the transport film (81), laminate portions (91) remain. Other configurations of deflection apparatus for peeling off the stamped grid (92) are also conceivable.

The transport film (81) with the laminate portions (91) adhering thereto is continued to be conveyed by means of the discontinuous conveyor. For example, the laminate portions (91) are transferred from the transport film (81) to a protective film and finally packed in side-sealed bags.

Figure 2:
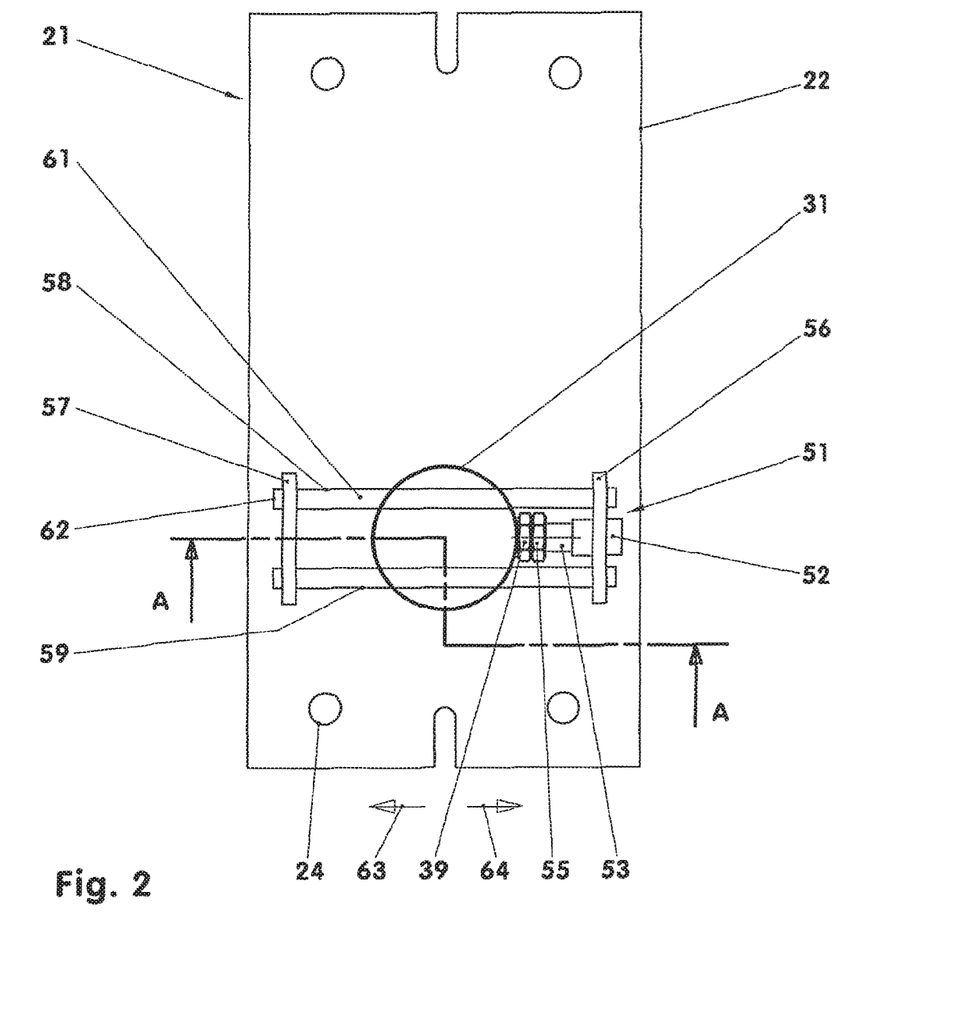
FIG. 2: Top view of the tool carrier.
Figure 3:
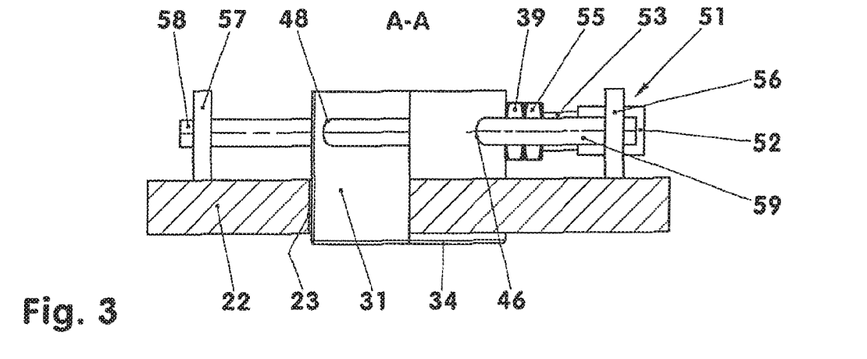
FIG. 3: Section A-A of FIG. 2.

FIGS. 2 and 3 show a tool carrier (22) with the separating tool (31) and a drive unit (51). In the exemplary embodiment, the tool carrier (22) is a rectangular carrier plate (22) with an opening (23). In the exemplary embodiment, the cross-section of the opening (23) is of a circular configuration. The diameter of the opening (23) is larger than the sum of the outer diameter of the separating tool (31) and the stroke of the drive unit (51) for displacing the tool. At all four corners the carrier plate (22) has e.g. countersunk through-going boreholes (24) for fastening to a knife lifting/lowering device by means of screws, for example. When the apparatus is mounted, the longitudinal direction of the carrier plate (22) is oriented in the conveying direction (5). The carrier plate (22) is disposed in parallel to the counterpressure plate (11).

On the carrier plate (22), the drive unit (51) is fastened. This drive unit (51) comprises two brackets (56, 57) in which two guide rods (58, 59) arranged in parallel to each other are fastened. These guide rods (58, 59) have a cylindrical cross-section in a carrying area (61) between the brackets (56, 57). They pass through the separating tool (31) and support the latter in a shiftable manner. Thus they form a tool guide. The two guide rods (58, 59) are e.g. made from an austenitic steel and comprise a slide coating in the carrying area (61), for example. In the exemplary embodiment, they have a rated diameter of 5 millimeters with a tolerance zone g6 according to ISO 286 in the carrying area (61), for example. The actual diameter of the guide rods (58, 59) in the carrying area (61) thus ranges between 4.988 and 4.996 millimeters. The two fastening ends (62) of the guide rods (58, 59) seated in the brackets (56, 57) can be configured with a different cross-section.

In the bracket (56) illustrated on the right side of FIGS. 2 and 3, an actuator (52) is fastened between the guide rods (58, 59). This actuator (52) comprises a ram (53) adapted to be linearly moved and having a stroke of 100 micrometers, for example. It can transmit both compressive and tensile forces. Its neutral position can be at a central position or at an end position of its stroke. The actuator (52) can be capacitively operated, for example, e.g. by means of piezo elements, compressed air etc. Its stroke frequency can be smaller than 10 hertz. For example, the stroke frequency used ranges between 0.5 hertz and 5 hertz. In this exemplary embodiment, the head of the ram (53) pointing to the separating tool (31) is fastened to the separating tool (31). For example, it is screwed into a nut (39) fastened to an outside (33) of the separating tool (31) and secured by means of a locking nut (55).

Figure 4:
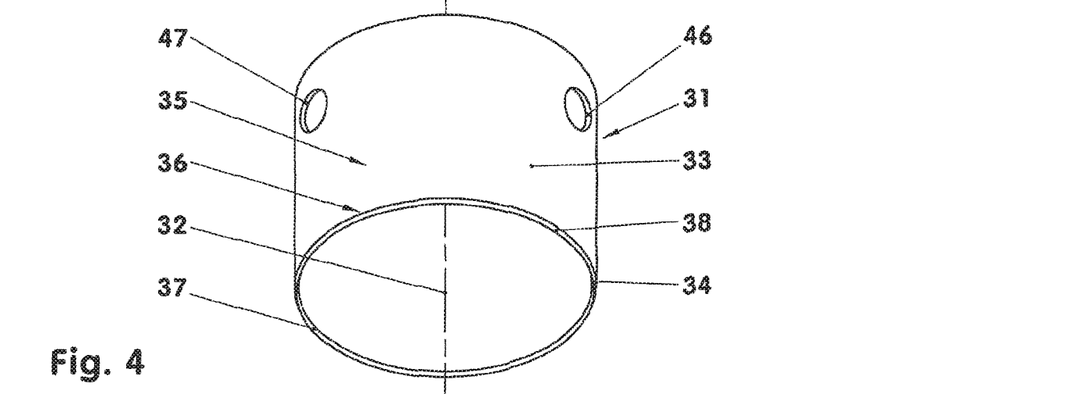
FIG. 4: Separating tool.

In FIG. 4, a separating tool (31) of a ring knife type (31) is illustrated. This ring knife (31) is made from a tool steel and has a cylinder jacket shape, for example. It comprises a supporting body (35) and a tool area (36). Its outer diameter is 36 millimeters, its height amounts to 77% of the diameter, for example. The thickness of the ring knife (31) is e.g. 0.5 millimeters. In the supporting body (35) facing away from the tool cutting edge (34) the ring knife (31) comprises four openings (46-48) with two of them each being flush with each other. As seen from the actuator (52), the openings (46-48) have a circular cross-section. In this projection, the diameter of each of these openings (46-48) lies within a tolerance zone H7 according to ISO 286 about the rated dimension, for example. In the present exemplary embodiment, the rated dimension is 5 millimeters. The actual diameter of the borehole thus ranges between 5 millimeters and 5.012 millimeters. One of the two borehole pairs can also be configured as an oval or an ellipse. The major axis of the respective openings is then oriented in the circumferential direction of the ring knife (31). The length of the minor axis of the openings (46-48) oriented in parallel to the center axis (32) of the ring knife (31) then lies within the aforementioned tolerance zone. The separating tool (31) mounted to the guide rods (58, 59) has a respective clearance fit with respect to the guide rods (58, 59).

In this exemplary embodiment, the tool cutting edge (34) is configured as an acute-angled edge and is formed by the intersecting line of an internal-pressure surface (37) and an external-pressure surface (38). The tool cutting edge (34) spans a cutting edge plane (65), cf. FIGS. 12 and 13. This cutting edge plane (65) is normal to the center axis (32) of the separating tool (31) and normal to the tool stroke directions (41, 42). The internal-pressure surface (37) and the external-pressure surface (38) are the tool flanks (37, 38) of the separating tool (31). On its inside, the tool cutting edge (34) is limited by the internal-pressure surface (37). In the ring knife (31) illustrated in FIG. 4, it is of a truncated configuration. Here, the imagined apex lies on the center axis (32) in a manner displaced towards the supporting body (35) with respect to the tool cutting edge (34). The apex angle of the truncated cone can amount to 90 degrees. The surface lines of the internal-pressure surface (37) can also be arranged in parallel to each other. In this case, the internal-pressure surface (37) is a cylinder inner surface, cf. FIG. 7.

The outside of the tool cutting edge (34) is limited by the external-pressure surface (38). In the exemplary embodiment, this external-pressure surface (38) is of a truncated configuration. The apex of the imagined cone lies on the center line (32) on the side of the cutting tool (31) facing away from the supporting body (35). In the exemplary embodiment, the apex angle of this cone is 27 degrees. This angle can amount to up to 90 degrees.

The internal-pressure surface (37) and the external-pressure surface (38) together include a cutting edge angle. In a radial section of the separating tool (31) illustrated in FIG. 4, the internal-pressure surface (37) and the external-pressure surface (38) form legs of an isosceles triangle whose third side is a normal to the center axis (32) of the separating tool (31). In this exemplary embodiment, the cutting edge angle is symmetrical with respect to the center of the tool cutting edge (34). An unsymmetrical configuration of the cutting edge angle is also conceivable. The tool flanks (37, 38) can be coated.

Figures 5, 6, 7:
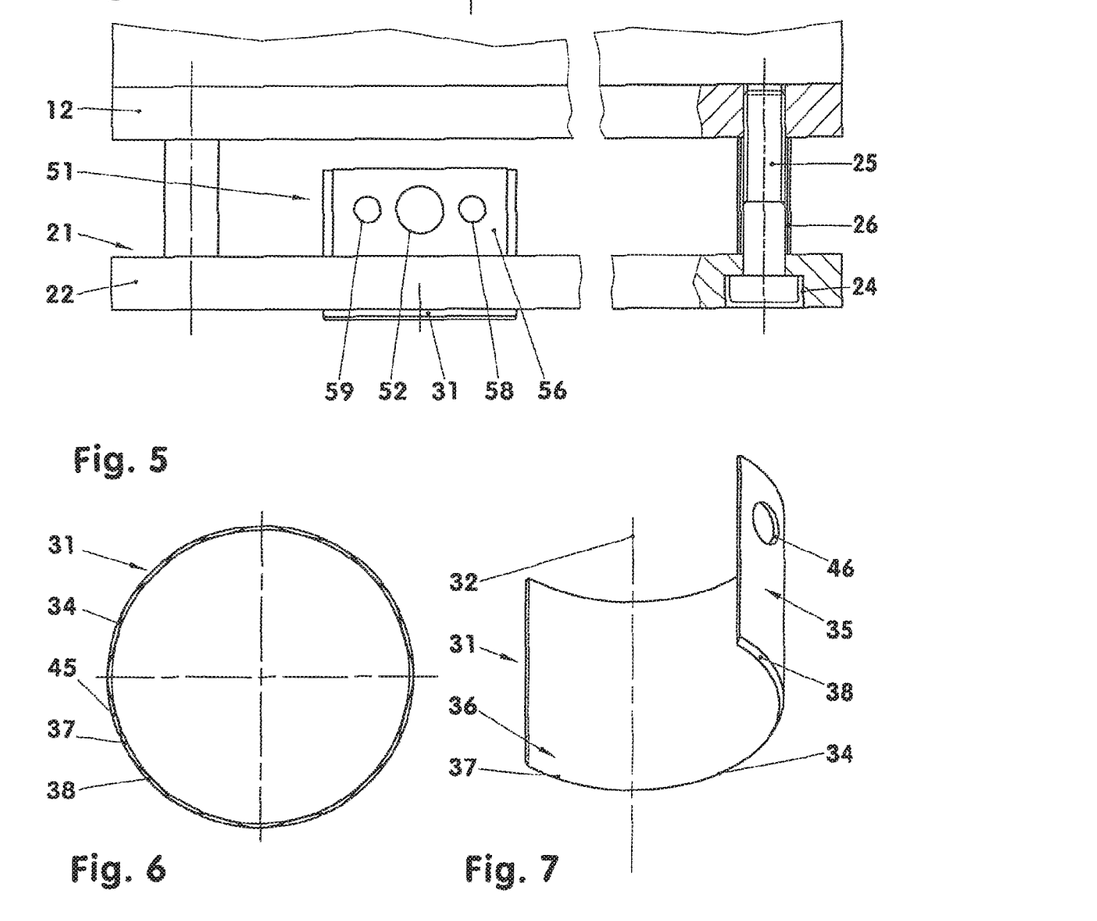
FIG. 5: View of the tool unit normal to the central longitudinal axis.
FIG. 6: Serrated separating tool.
FIG. 7: Section of a separating tool with inner cutting edge.

FIG. 5 shows a view of the separating tool unit (21) mounted to a lifting/lowering plate (12) normal to the center axis plane oriented in the conveying direction (5). The lifting/lowering plate (12), together with the separating tool unit (21), is adapted to be moved in the stroke directions (41, 42) normal to the counterpressure plate (11). The tool carrier (22) is fastened to the lifting/lowering plate (12) by means of four screws (25) passing through through-going boreholes (24). Between the lifting/lowering plate (12) and the tool carrier (22) spacer sleeves (26) are seated on the screws (25). The distance between the lifting/lowering plate (12) and the tool carrier (22) is thus constant. The ring knife (31) projects downwards from the tool carrier (22) by 2 millimeters, for example.

The drive unit (51) with the actuator (52) and the guide rods (58, 59) is seated on the tool carrier (22). The guide rods (58, 59) and the actuator (52) are retained in the bracket (56) fastened to the tool carrier (22).

FIG. 6 illustrates a bottom view of another separating tool (31). The tool cutting edge (34) of this ring knife (31) has a serration (45). Along its length, the tool cutting edge (34) travels to and fro between a straight line flush with the inner wall and a straight line flush with the outer wall. Both tool flanks (37, 38) are serrated. Their angle with the center axis (32) of the separating tool (31) ranges between zero degrees and 54 degrees. The supporting body (35) of this separating tool (31) is configured in the same way as the supporting body (35) of the separating tool (31) illustrated in FIG. 4.

FIG. 7 shows an isometric sectional view of another separating tool (31). It has a cylindrical internal-pressure surface (37). The internal-pressure surface (37), together with the conical external-pressure surface (38), forms the tool cutting edge (34). In this exemplary embodiment, too, the cutting edge angle ranges between 20 degrees and 45 degrees. The supporting body (35) of the separating tool (31) is configured in the same way as described in the aforementioned examples.

The tool cutting edge (34) can also be sawtooth-shaped. Here, all teeth can be oriented in the same direction. It is also conceivable that part of the teeth, for example half of them, are oriented in the opposite direction. In the case of a sawtooth-shaped tool cutting edge (34), the tips pointing towards the counterpressure plate (11) lie in the cutting edge plane (65).

In FIGS. 8-11 the use of the separating tool (31) is illustrated. The ring knife (31) illustrated in these Figures corresponds to the ring knife (31) shown in FIG. 7. When being operated, the separating tool (31) is first moved in the tool stroke direction (41) normal to the laminate sheet (80) towards the counterpressure plate (11). It hits upon the cover film (83), thereby stretching it, cf. FIG. 8. Along the line generated by the tool cutting edge (34) the cover film (83) is countersunk. The elastically and plastically deformable substrate layer (82) is compressed.

Figure 8:
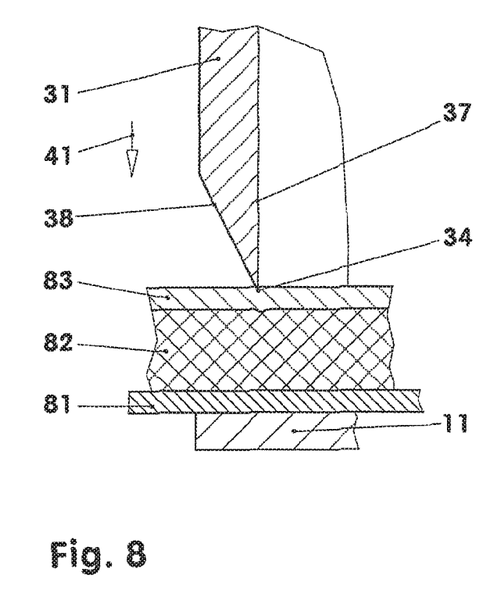
FIG. 8: Separating tool of FIG. 7 when contacting the laminate sheet.

During further lowering of the separating tool (31), the cover film (83) is stretched. When the aforementioned elongation at break is exceeded, first cracks occur in the cover film (83). When the separating tool (31) is further lowered, the cover film (83) completely tears along the tool cutting edge (34) and the separating tool (31) enters the substrate layer (82).

When passing through the substrate layer (82), the external-pressure surface (38) area-wise dislocates the surrounding area (86) of the composite material (80) embracing the separating tool (31) towards the outside. Here, the cover film (83) and the substrate layer (82) are displaced in the tool stroke direction (41) in the immediate surroundings of the separating tool (31) and are then e.g. bulged. For example, a ring-shaped bulge (88) occurs.

In the inner area (87) surrounded by the separating tool (31) the lowering of the separating tool (31) in the tool stroke direction (41) causes the cover film (83) and the substrate layer (82) to be also dislocated. Due to the different angles of the tool flanks (37, 38) with respect to the tool stroke direction (41), in this exemplary embodiment, dislocation of the composite material (80) in the inner area (87) is smaller than dislocation in the surrounding area (86).

The dislocated composite material (80) stretched area-wise and torn area-wise presses against the separating tool (31) from the outside and from the inside. For example, the coating of the two tool flanks (37, 38) with a separating agent prevents the adhesive of the substrate layer (82) from adhering to the separating tool (31).

Figure 9:
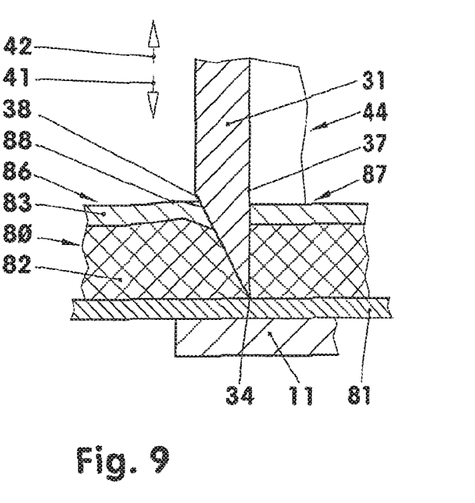
FIG. 9: Separating tool in the parting position.

In the illustration of FIG. 9, the separating tool (31) is lowered into the parting position (44). For example, the tool cutting edge (34) of the separating tool (31) rests upon the transport film (81). Thereby, the transport film (81) can be compressed. It is supported by means of the counterpressure plate (11). The substrate layer (82) is largely parted, but adhesive-containing portions can be located between the inner area (87) and the surrounding area (86). The ring knife (31) extends into the composite material (80) in a wedge-type manner. Both pressure surfaces (37, 38) are loaded. When using the ring knife (31) illustrated in FIG. 7, the bulge (88) in the surrounding area (86) is more pronounced than in the inner area (87).

Figure 10:
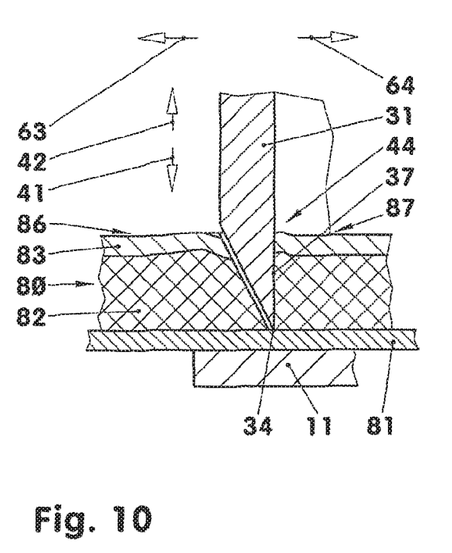
FIG. 10: Separating tool when displaced in the transverse direction.

When the separating tool (31) is in the parting position (44), in the exemplary embodiment, the actuator (52) is activated, cf. FIG. 10. The separating tool (31) is displaced and moved back along the guide rods (58, 59) by means of the actuator (52). This is performed by means of the ramp function, wherein the separating tool (31) linearly follows the ram (53) of the actuator (52) due to the coupling. Here, in one cycle, the separating tool (31) is displaced by the complete stroke of the ram (53) of the actuator (52) both in the displacing direction (63) and in the opposite displacing direction (64). When the cycle is completed, the separating tool (31) is again in its initial position. In the parting position (44), the separating tool (31) can be repeatedly moved in the displacing directions (63, 64).

When the actuator (52) is operated, the remaining portions of the substrate layer (82) between the inner area (87) and the surrounding area (86) are separated by stretching and/or shearing. Both the inner area (87) and the surrounding area (86) continue to adhere to the transport film (81).

During the return stroke (42) of the separating tool (31) from the parting position (44) towards the inoperative position (43), the actuator (52) can continue to be operated. The separating tool (31) is moved upwards along the substrate layer (82). Once the separating tool (31) has left the composite material (80), the ring-shaped contour geometry (85) remains.

Figure 11:
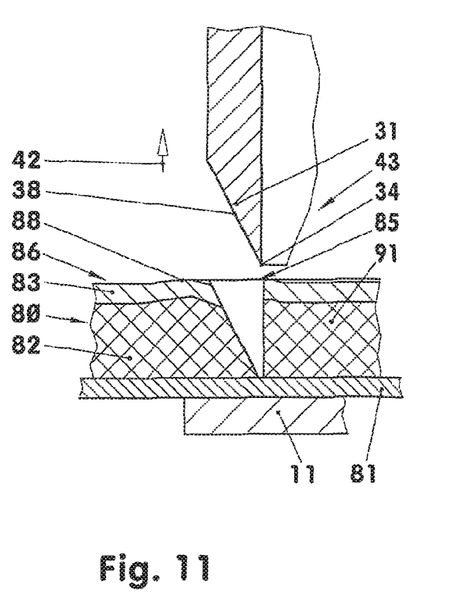
FIG. 11: Separating tool in the inoperative position.

FIG. 11 shows the separating tool (31) in the inoperative position (43) after the return stroke (42). The substrate layer (82) relieved of the tool flanks (37, 38) has area-wise assumed it original shape. The separating tool (31) has left the composite material (80). The inner area (37) and the outer area (38) are completely separated from each other.

Figure 12:
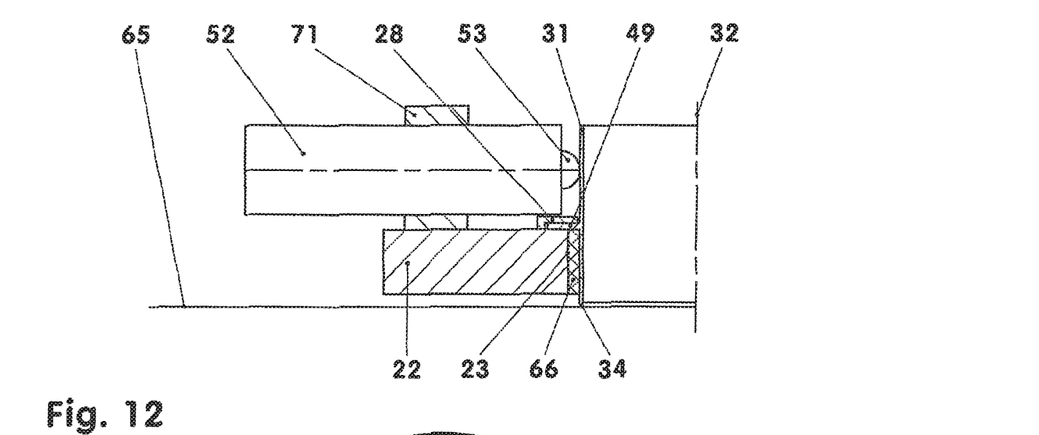
FIG. 12: Partial section of an apparatus with an elastically supported separating tool.
Figure 13:
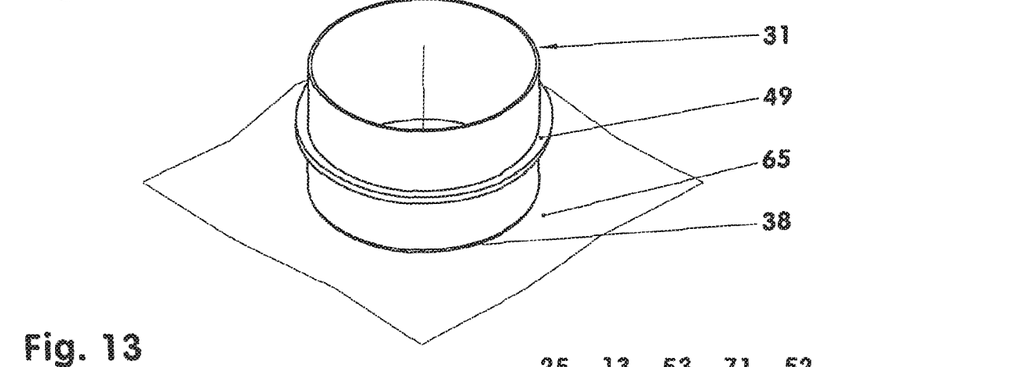
FIG. 13: Separating tool of FIG. 12.

FIG. 12 illustrates a partial section of a separating tool unit (21). In this exemplary embodiment, too, the separating tool (31) is configured as a ring knife (31). It can also be configured as a straight knife. The separating tool (31), cf. FIG. 13, has e.g.

a circumferential knife collar (49) on its outside (33). In this illustration, too, the separating tool (31) is seated in the opening (23) of the carrier plate (22). Moreover, an elastomeric ring (66) surrounding the separating tool (31) is seated in the opening (23). The former can be a rubber ring, for example. The separating tool (31) is thus elastically supported in the carrier plate (22). Its cutting edge plane (65) is normal to the tool stroke directions (41, 42). The knife collar (49) can rest upon the carrier plate (22) and/or upon the elastomeric ring (66). A ring-shaped knife securing device (28) fastened to the carrier plate (22) prevents the separating tool (31) from being lifted relative to the carrier plate (22). The knife collar (49) and the knife securing device (28) can also be arranged below the carrier plate (22). The knife collar (49) and the knife securing device (28) can be configured as segments, for example. The separating tool (31) and/or the carrier plate (22) can then be prevented from rotating in the operating position, for example. The maximum clearance of the separating knife (31) relative to the carrier plate (22) in the tool stroke directions (41, 42) can be smaller than 20 micrometers.

On the carrier plate (22) the drive unit (51) with the actuator (52) arranged radially to the separating tool is seated. Also, use of a plurality of actuators (52) oriented in different radial directions relative to the separating tool (31) is conceivable. In this exemplary embodiment, the ram (53) configured as a ball segment is not fixedly connected to the separating tool (31). For example, the ram (53) is spaced apart from the separating tool (31) by 1/10 of the actuator stroke in the inoperative position of the actuator (52). This distance can range between zero and 9/10 of the actuator stroke, for example.

The remaining configuration of the apparatus (10) corresponds to the configuration of the apparatus described in connection with FIGS. 1-11. During operation of the apparatus (10), the carrier plate (22), together with the separating tool (31), is e.g. lowered towards the counterpressure plate (11). For example, when the separating tool (31) is in the parting position (44) and/or during the return stroke (44), the actuator (52) is operated. The ram (53) hits upon the separating tool (31) such that the latter is moved in an excitation direction (63). This excitation direction (63) is parallel to the cutting edge plane (65). First, the carrier plate (22) with the separating tool (31) is controlled by means of a jump function, wherein the ram (53) hits upon the carrier plate (22). Subsequently, the carrier plate (22) with the separating tool (31) is moved linearly along a ramp function relative to the counterpressure plate (11). Thereby, the elastomeric ring (66) is deformed. Once the ram (53) of the actuator (52) has returned into its retracted initial position, the elastomeric ring (66) forming a restoring element (66) resumes its original shape. When the actuator (52) is operated again, this sequence of movements is repeated.

If the separating tool (31) is intended to be exchanged, the separating tool unit (21) as a whole can be removed and a new separating tool unit (21) can be mounted, for example. In the case of a configuration with a segment-type knife ring (49) and a segment-type knife securing device (28), the separating tool (31) can be pivoted about the center axis (32) relative to the carrier plate (22) for removing purposes. Mounting is performed in the reverse direction.

Figure 14:
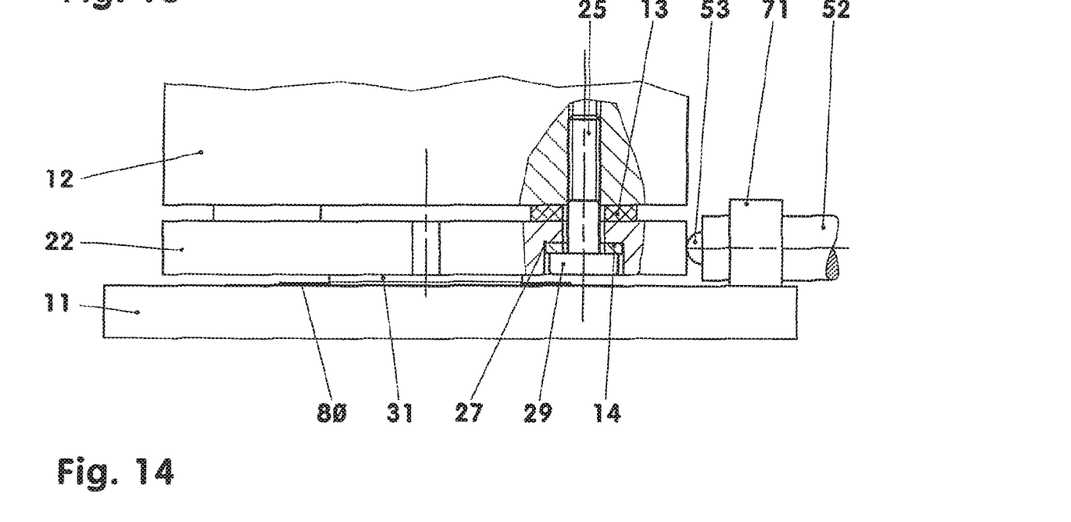
FIG. 14: Apparatus having a drive unit arranged at the carrier plate.

FIG. 14 shows another arrangement of the tool unit (21) with the drive unit (51). The carrier plate (22) is fastened to the lifting/lowering plate (12) by means of screws (25). Between the lifting/lowering plate (12) and the carrier plate (22) elastically deformable bodies (13) are arranged. They can e.g. be configured as elastomeric bodies or as plate springs. The screw head (29) is supported in the countersunk portion (27) of the through-going borehole (24) on a sliding disk (14). The sliding disk (14), the through-going borehole (24) of the carrier plate (22) and the elastically deformable body (13) have a radial clearance with respect to the screw (25).

The separating tool (31) is produced from a rolled strip steel, for example. It is clamped into the carrier plate (22). An inner insert can additionally press the separating tool to the wall of the opening (23).

In this exemplary embodiment, the drive unit (51) with the actuator (52) is fastened to the counterpressure plate (11). The actuator (52) is configured as described in connection with the previous exemplary embodiment. A horizontal center plane of the actuator (52) also is a horizontal center plane of the carrier plate (22), for example.

In the inoperative position of the actuator (52), the ram (53) rests upon the carrier plate (22) or is slightly spaced apart from the latter. The maximum distance corresponds to the maximum distance between the ram (53) and the separating tool (31) stated in the previous exemplary embodiment.

When the actuator (52) is operated, the latter displaces the carrier plate (22) with the separating tool (31) relative to the counterpressure plate (11) in a plane parallel to the cutting edge plane (65). In this plane, the excitation direction (63) can be oriented normal to the conveying direction (5), for example.

When the carrier plate (22) is excited, the elastically deformable bodies (13) are deformed. These restoring elements (13) build up a restoring force. The carrier plate (22) is shifted relative to the lifting/lowering plate (12). Here, the screw head (29) slides along the sliding disk (14). During return movement of the extended ram (53), the elastically deformed elements (13) are released. The carrier plate (22) is returned into its initial position relative to the counterpressure plate (11) counter to the excitation direction (63). In this exemplary embodiment, too, the actuator (52) can be operated when the separating tool (31) is in the parting position (44) or during the return stroke (42) of the separating tool (31).

It is also conceivable that the actuator (52) acts upon the counterpressure plate (11). For example, the counterpressure plate (11) is then floatingly supported. The actuator (52) can be fastened to a fixed machine part or to the carrier plate (22). When the actuator (52) is operated, the ram (53) transmits a pulse to the counterpressure plate (11). The latter, together with the composite material (80) resting on the counterpressure plate (11), is displaced relative to the separating tool (31). The contour geometry (85) is widened such that the portions of the adhesive-containing substrate layer (82) remaining during the stroke of the separating tool (31) in the tool stroke direction (41) are parted.

Figure 15:
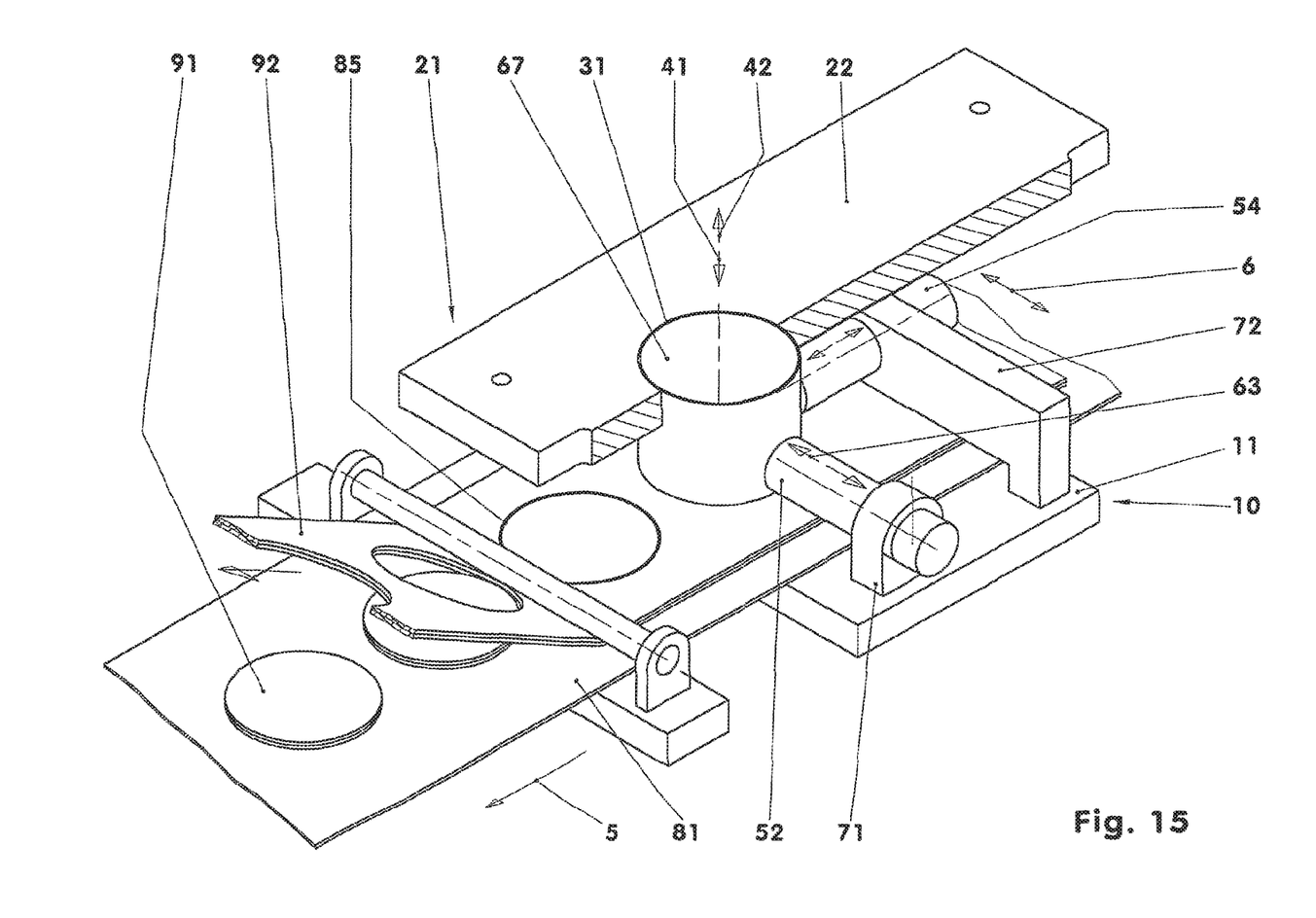
FIG. 15: Apparatus with two drive units.
Figure 16:
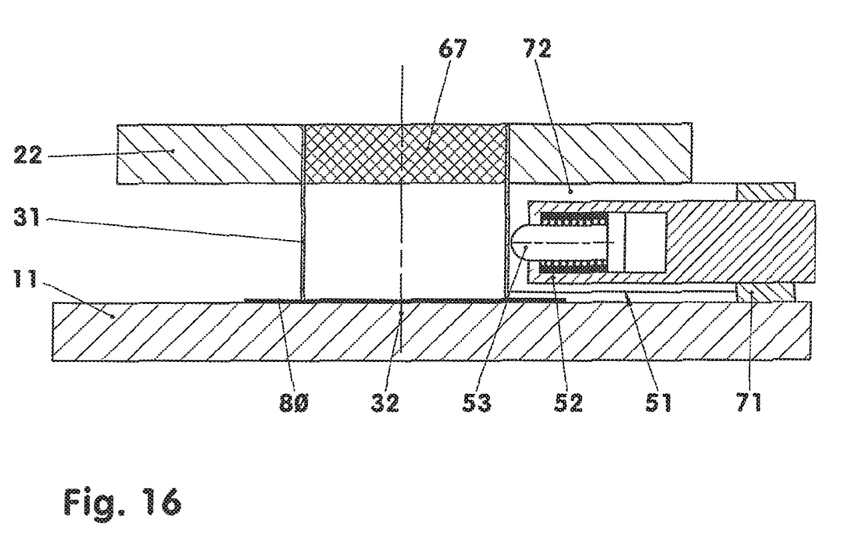
FIG. 16: Cross-section of FIG. 15.

In FIGS. 15 and 16 an apparatus (10) having two drive units (51) is illustrated. Here, FIG. 15 shows an isometric illustration of the apparatus (10). In FIG. 16 a cross-section of the apparatus (10) is illustrated, wherein the sectional plane extends through the center axis (32) and is normal to the conveying direction (5).

In this exemplary embodiment, too, the separating tool (31) is a ring knife (31). It is seated in the carrier plate (22) in a fixedly clamped manner. Additionally, an inner insert (67) secures the position of the separating tool (31) relative to the carrier plate (22). In this exemplary embodiment, the separating tool (31) projects beyond the carrier plate (22) towards the counterpressure plate (11) by 60% of the diameter of the separating tool (31). Both the illustration of FIG. 15 and the illustration of FIG. 16 show the separating tool (31) in the parting position (44). The cutting edge plane (65) of the separating tool (31) is spaced apart from the counterpressure plate (11) by the thickness of the transport film (81).

To the counterpressure plate (11) two adapters (71, 72) are fastened, each carrying an actuator (52, 54). The two actuators (52, 54) have an identical configuration, for example. They each have a pneumatically operated ram (53) with a spring return function, for example. A different kind of operation of the ram (53) is also conceivable.

In a top view of the separating tool (31) the two actuators (52, 54) are offset with respect to each other by 90 degrees. For example, a first actuator (52) is arranged normal to the vertical central longitudinal plane of the apparatus (10) oriented in the conveying direction. A second actuator (54) is oriented normal to the central transversal plane of the apparatus (10) in the conveying direction (5). In this exemplary embodiment, the actuators (52, 54) are spaced apart from the separating tool (31) by at least one tenth and at maximum by 100% of their stroke.

When the separating tool (31) is lowered in the tool stroke direction (41), the bell-type separating tool (31) is moved in a contactless manner in front of the ram (53) of the actuators (52, 54). For example, once the separating tool (31) has reached the parting position (44), the first actuator (52) is operated. The ram (53) hits upon the separating tool (31). The separating tool (31) is excited to vibrate transversely to the conveying direction (5) due to this jump function. For example, at the same time as the hitting of the ram (53) of the first actuator (52), the second actuator (54) is operated. Its ram (53) is extended and hits upon the separating tool (31) in the conveying direction (5). The excitation direction of this vibration is oriented in the conveying direction (5). During the return stroke (42), the alternating operation of the first (52) and the second actuator (54) can be continued. The adhesive-containing substrate layer (82) is parted.

The operation of the two actuators (52, 54) can be performed simultaneously or in a staggered manner. Also, one of the actuators (52; 54) or both actuators (52, 54) can be arranged in the ring knife (31).

Also, combinations of the aforementioned exemplary embodiments are conceivable.

REFERENCE SIGN LIST

5 Conveying direction
6 Width direction
10 Apparatus

11 Counterpressure plate
12 Lifting/lowering plate
13 Elastically deformable bodies, restoring elements
14 Sliding disk
21 Separating tool unit
22 Carrier plate, tool holder, tool carrier
23 Opening
24 Through-going borehole
25 Screws
26 Spacer sleeves
27 Countersunk portion
28 Knife securing device
29 Screw head
31 Separating tool, ring knife
32 Center axis of (31)
33 Outside of (31)
34 Tool cutting edge
35 Supporting body
36 Tool area
37 Internal-pressure surface, tool flank inside
38 External-pressure surface, tool flank outside
39 Nut
41 Tool stroke direction towards (44)
42 Tool stroke direction towards (43), return stroke
43 Inoperative position of (31)
44 Parting position
45 Serration
46 Opening in (31)
47 Opening in (31)
48 Opening in (31)
49 Knife collar
51 Drive unit
52 Actuator, first actuator
53 Ram
54 Actuator, second actuator
55 Locking nut
56 Bracket
57 Bracket
58 Guide rod
59 Guide rod
61 Carrying area
62 Fastening ends
63 Displacing direction, excitation direction
64 Displacing direction, excitation direction
65 Cutting edge plane
66 Elastomeric element, restoring element
67 Inner insert
71 Adapter
72 Adapter
80 Laminate sheet, composite material
81 Transport film, carrier film
82 Substrate layer
83 Cover film
84 Surface of (80)
85 Contour geometries
86 Surrounding area
87 Inner area
88 Bulge
91 Laminate portions
92 Stamped grid
93 Deflection roller

The invention claimed is:

1. A device comprising:
a. a separating tool; and
b. a counterpressure plate for producing contour geometries in adhesive-containing composite materials,
wherein the separating tool is adapted to be moved in translational tool stroke directions between an inoperative position and a parting position normal to the counterpressure plate,
wherein in the parting position, the separating tool is spaced apart from the counterpressure plate towards the inoperative position,
wherein the separating tool comprises a tool cutting edge having a cutting edge plane spanned normal to the tool stroke directions,
wherein the device comprises at least one actuator,
wherein the separating tool and the counterpressure plate are adapted to be controlled relative to each other by means of the at least one actuator in at least one excitation direction by means of a ramp function and/or a jump function, and
wherein the at least one excitation direction lies in a parallel plane to the cutting edge plane of the separating tool.

2. The device according to claim 1, wherein the separating tool has a closed contour and its center axis is parallel to the translational tool stroke directions.

3. The device according to claim 1, wherein the at least one excitation direction is linearly oriented.

4. The device according to claim 1, wherein a stroke of the at least one actuator is smaller than or equal to one millimeter.

5. The device according to claim 1 further comprising two actuators, wherein the two actuators are oriented in a plane parallel to the cutting edge plane and normal to each other.

6. A method for producing contour geometries in adhesive containing composite materials by means of a device according to claim 1,
wherein the separating tool is moved in translational tool stroke directions normal to the counterpressure plate from the inoperative position to the parting position and back,
wherein in the parting position, the separating tool is spaced apart from the counterpressure plate,
wherein the separating tool parts the composite material having an adhesive-containing substrate layer, and
wherein, in the parting position and/or during a return stroke, the at least one actuator controls the separating tool and the counterpressure plate relative to each other in parallel to the cutting edge plane by means of a ramp function or a jump function.

7. The method according to claim 6, wherein in the parting position, distance of the separating tool to the counterpressure plate corresponds at least to the thickness of a transport film of the adhesive-containing composite material and is at maximum 100 micrometers larger than the thickness of the transport film.

* * * * *